(12) United States Patent
Kerr, Jr. et al.

(10) Patent No.: US 6,325,654 B1
(45) Date of Patent: Dec. 4, 2001

(54) QUICK CONNECT DEVICE FOR MOUNTING A SUSPENDED ELECTRICAL FIXTURE

(75) Inventors: Jack Russell Kerr, Jr., College Station; Cullyn B. Winn, Bryan, both of TX (US)

(73) Assignee: Angelo Fan Brace Licensing, L.L.C., Philadelphia, PA (US)

( * ) Notice: Subject to any disclaimer, the term of this patent is extended or adjusted under 35 U.S.C. 154(b) by 0 days.

(21) Appl. No.: 09/511,805

(22) Filed: Feb. 23, 2000

Related U.S. Application Data

(62) Division of application No. 09/360,268, filed on Jul. 26, 1999, now Pat. No. 6,146,191.

(51) Int. Cl.$^7$ .................................................. H01R 13/62
(52) U.S. Cl. ........................................... 439/313; 439/892
(58) Field of Search .................................... 439/313, 334, 439/351, 529, 537

(56) References Cited

U.S. PATENT DOCUMENTS

| D. 283,156 | 3/1986 | Mandelli et al. ................. D23/158 |
| 969,409 | * 9/1910 | Russell . |
| 1,030,007 | 6/1912 | Miller . |
| 1,222,837 | 4/1917 | Winslow et al. . |
| 1,486,896 | * 3/1924 | Hubbell . |
| 1,506,522 | 8/1924 | Gansel . |
| 1,636,278 | * 7/1927 | Benjamin . |
| 1,646,806 | * 10/1927 | Benjamin . |
| 1,666,223 | 4/1928 | Symmes . |
| 1,666,411 | 2/1928 | D'Olier, Jr. . |
| 1,701,935 | 2/1929 | Ryan . |
| 1,702,888 | 2/1929 | Balch . |
| 1,742,438 | 1/1930 | D'Olier, Jr. . |
| 1,796,036 | 3/1931 | Mangin . |
| 2,349,924 | 5/1944 | Anderson ............................. 248/343 |
| 2,414,173 | 1/1947 | Schuman .............................. 174/52 |
| 2,547,896 | 4/1951 | Wellen ................................. 230/241 |

(List continued on next page.)

FOREIGN PATENT DOCUMENTS

| 223834 | 12/1942 | (CH) . |
| 456372 | 2/1928 | (DE) . |
| 674.956 | 2/1930 | (FR) . |
| 1.331.492 | 6/1965 | (FR) . |
| 2299 | 2/1905 | (GB) . |
| 182097 | 8/1923 | (GB) . |
| 1073791 | 6/1967 | (GB) . |
| 2 149 013 A | 6/1985 | (GB) . |
| 5-157092 (A) | 6/1993 | (JP) . |

*Primary Examiner*—Neil Abrams
(74) *Attorney, Agent, or Firm*—Drinker Biddle & Reath LLP

(57) ABSTRACT

A mounting device for mounting an electrical fixture to an overhead support and electrically connecting the fixture to an electrical supply. The mounting device includes a mounting plate, a coupling plate, an electrical receptacle and an electrical plug. The device also includes a cap for covering receptacle terminals and a ball and socket support for the fixture. The mounting plate attaches to a junction box and contains the receptacle, which connects to an electrical supply. The coupling plate attaches to an electrical fixture and rotatably engages the receiving plate. The plug is rotatably secured to the coupling plate and includes a plurality of electrical conductors and a skirt surrounding the conductors. The receptacle includes a body having a plurality of sockets for receiving the conductors and an outer periphery shaped to slidably engage the inner periphery of the plug skirt. Rotation prevention screws may be used to avoid plate separation.

23 Claims, 13 Drawing Sheets

U.S. PATENT DOCUMENTS

| | | | |
|---|---|---|---|
| 2,671,821 | 3/1954 | Zientowski et al. | 174/54 |
| 2,933,240 | 4/1960 | Brese | 230/259 |
| 3,302,918 | 2/1967 | Cohen | 248/343 |
| 3,356,840 | 12/1967 | Cohen | 240/78 |
| 3,401,874 | 9/1968 | Covington | 230/241 |
| 3,725,840 * | 4/1973 | Hesse . | |
| 4,098,547 | 7/1978 | Wrobel | 339/91 R |
| 4,160,576 | 7/1979 | Vettori | 339/119 R |
| 4,357,506 | 11/1982 | Breining | 200/52 R |
| 4,403,824 | 9/1983 | Scott | 339/186 R |
| 4,515,538 | 5/1985 | Shih | 417/572 |
| 4,548,554 | 10/1985 | Angott | 417/572 |
| 4,711,161 | 12/1987 | Swin, Sr, et al. | 98/31.5 |
| 4,721,480 | 1/1988 | Yung | 439/527 |
| 4,725,240 | 2/1988 | Baverman | 439/105 |
| 4,808,071 | 2/1989 | Chau | 416/5 |
| 4,810,207 * | 3/1989 | Butterfield | 439/529 |
| 5,094,676 | 3/1992 | Karbacher | 55/316 |
| 5,242,269 | 9/1993 | Chang | 416/244 |
| 5,376,020 * | 12/1994 | Jones | 439/537 |
| 5,421,701 | 6/1995 | Funston | 415/5 |
| 5,567,117 | 10/1996 | Gunn et al. | 416/244 R |
| 5,586,867 | 12/1996 | Mehlos | 417/45 |
| 5,658,129 | 8/1997 | Pearce | 416/5 |
| 5,738,496 | 4/1998 | Mehta | 417/44.1 |
| 5,762,223 | 6/1998 | Kerr, Jr. | 220/3.9 |
| 5,860,548 | 1/1999 | Kerr, Jr. | 220/3.2 |
| 5,900,583 | 5/1999 | Russo | 174/61 |
| 5,984,640 | 11/1999 | Wang | 416/244 R |
| 6,146,191 * | 11/2000 | Kerr, Jr. et al. | 439/537 |

* cited by examiner

QUICK CONNECT DEVICE FOR MOUNTING A SUSPENDED ELECTRICAL FIXTURE

CROSS REFERENCE TO RELATED APPLICATIONS

This application is a continuation-in-part of application Ser. No. 09/360,268, filed Jul. 26, 1999 issued as U.S. Pat. No. 6,146,691 on Nov. 14, 2000, and claims priority from a provisional application entitled "Electrical Plug And Receptacle Having Safety Features", filed Jan. 6, 2000.

FIELD OF THE INVENTION

The present invention is directed to the general field of suspended electrical fixtures and, more particularly, to devices that make easier the tasks of mounting a suspended electrical fixture to an overhead support and connecting the fixture to an electrical supply.

BACKGROUND OF THE INVENTION

The installation of a suspended electrical fixture to an overhead support can be a difficult task for a single installer. For example, to install a conventional ceiling fan, the fan is lifted to just below the electrical junction box and held there while connecting the fan wires to the electrical supply wires. After the electrical connection is finished, the fan is lifted further to place the fan bell over the junction box and held in that position while the fan is attached to the box or a ceiling hanger in some manner, typically with screws or bolts. The combined operation takes several minutes and usually requires two persons, one to lift and hold and the other to make the wire and screw connections.

Installing a suspended electrical fixture can also pose a risk of electrical shock to the installer and/or short-circuiting the electrical supply circuit. Some installers, particularly do-it-yourself homeowners, are prone to either forget or neglect to shut off the supply of electricity to the circuit they are installing the fixture in. Most conventional fixtures have bare-ended wires meant to be spliced to supply wires located in an overhead junction box. An installer who fails to shut off the electricity and splices live wires is destined to receive an electrical shock. Even if the fixture were supplied with a conventional electrical plug, an installer could get an electrical shock by touching one of the plug's prongs when the plug is partially inserted into a live receptacle. If the installer were to touch two of the partially inserted prongs simultaneously with a finger, tool or other conductive object, the supply circuit would also be short-circuited.

Some electrical fixture installations are subject to water infiltration, particularly those having junction boxes mounted in a ceiling adjacent a leaking roof, adjacent the underside of a roof on which condensation forms, under a bathroom or other area having leaking plumbing or the like. The infiltrating water can cause an electrical short, which could start a fire.

SUMMARY OF THE INVENTION

The present invention is directed to a mounting device for hanging an electrical fixture from an overhead support and connecting the fixture to an electrical supply. The mounting device includes a mount, a coupler, an electrical plug and an electrical receptacle. The mount is attachable to an electrical junction box and the coupler is attachable to an electrical fixture and engageable with the mount.

The electrical plug includes a plug base, a skirt and a plurality of elongated electrical conductors. The skirt is attached to and extends away from the plug base. The skirt has an inner surface and an inner periphery. The inner surface of the skirt and a portion of the plug base encompassed by the skirt define a cavity. The conductors engage the plug base and extend away from the plug base into the cavity.

The electrical receptacle includes a receptacle base and a receiver attached to the receptacle base. The receiver has an outer periphery and a plurality of sockets extending into the receiver. The outer periphery of the receiver is adapted to slidably engage the inner surface of the skirt of the plug. Each socket receives one of the conductors of the plug.

The plug is secured to either the mount or the coupler and the receptacle is secured to the other. The conductors and skirt of the plug engage the sockets and receiver, respectively, of the receptacle when the plug is engaged with the receptacle.

BRIEF DESCRIPTION OF THE DRAWINGS

For purposes of illustrating the invention, the drawings show one or more forms in which the invention can be embodied. The invention is not, however, limited to the precise forms shown unless such limitation is expressly made in a claim.

DETAILED DESCRIPTION OF THE INVENTION

Figure 1:
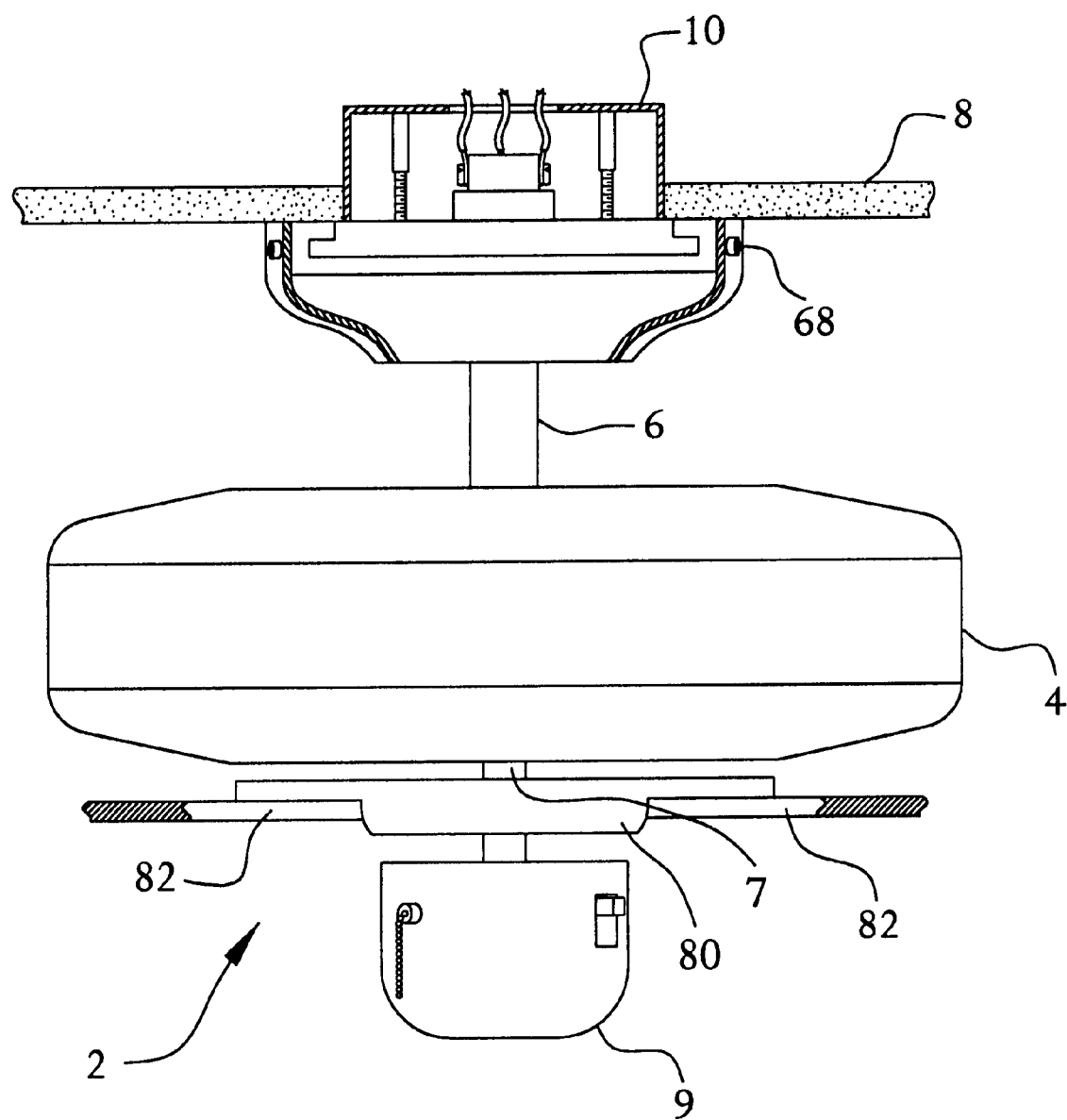
FIG. 1 is an elevation view of a conventional ceiling fan mounted to a ceiling with a quick-connect device according to the present invention.
Figure 2:
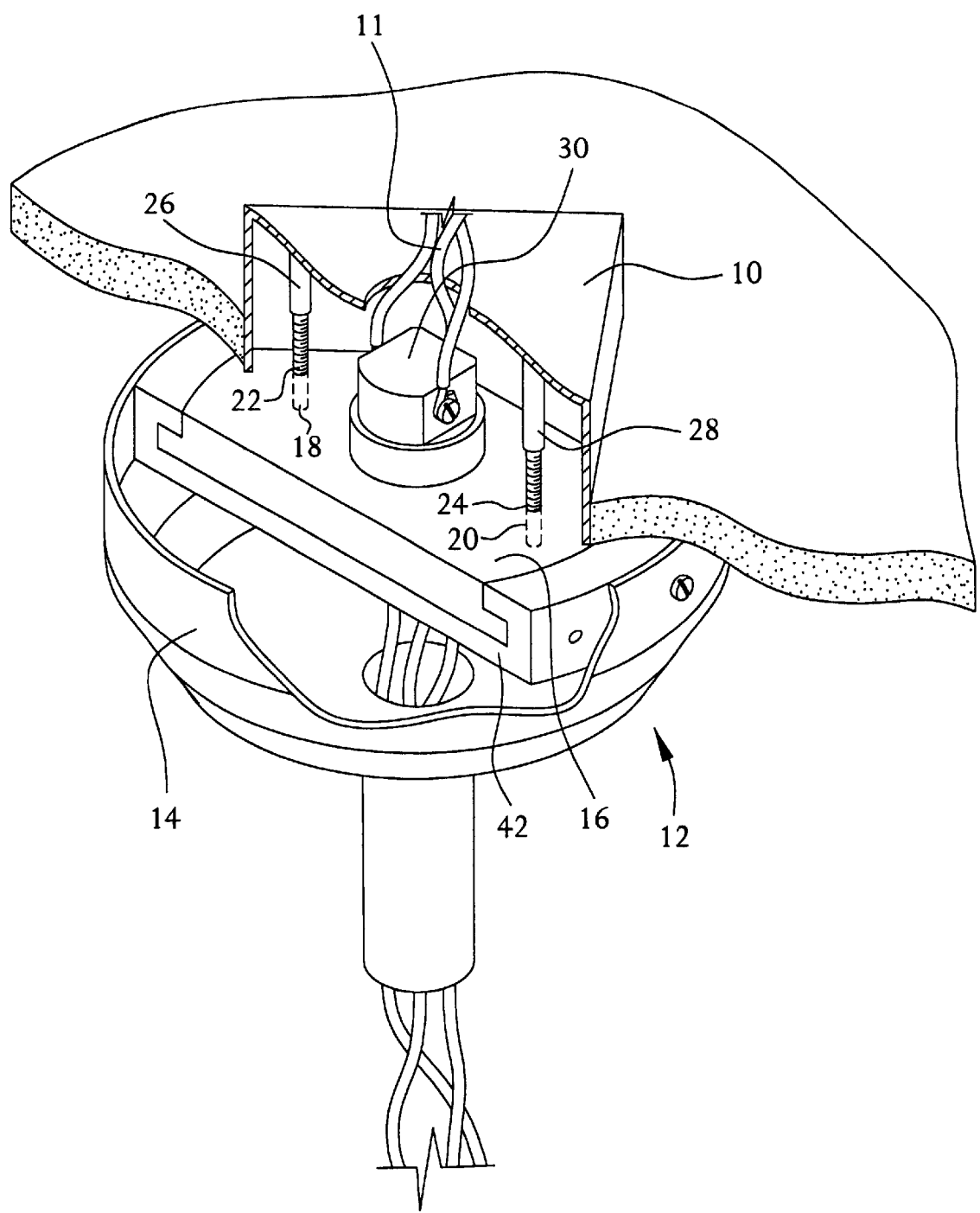
FIG. 2 is a perspective, partial sectional view of the quick connect device illustrated in FIG. 1.

In the drawings, where like numerals indicate like elements, a ceiling fan is generally indicated by the numeral 2. The fan elements are conventional, the particular type or design of these conventional elements not being material to the invention. These conventional elements include a drive housing 4 that encloses a drive motor (not visible in any of the drawings), a hanger tube 6 which provides a conduit for electrical wires, a bell 14 that covers the ceiling cut-out, a drive shaft 7 and a switch housing 9. The feature that is unique is a quick connect device by which the fan is easily hung from a ceiling 8 and connected to an electrical supply. Although a ceiling fan is illustrated in the drawings, any electrical fixture suspended from a support located above the fixture may be installed using the quick-connect device of the present invention. Examples of such suspended fixtures include chandeliers, speakers, security cameras, signs, television monitors and the like.

As shown in FIG. 1, an electrical junction box 10 is recessed in the ceiling 8. The junction box 10 is of the type that supports a ceiling fan and houses the electrical wires. A general characteristic of a ceiling fan junction box is that it has some type of reinforced screw receptacles, such as threaded metal blocks or threaded shoulder rivets, to receive screws attaching the fan to the box. U.S. Pat. Nos. 5,762,223 and 5,860,548, both to J. Russell Kerr, Jr., describe exemplary boxes of this type, and a box sold by Angelo Fan Brace, LLC under the trade name SAF-T-BOX Model 1050 is an example of an electrical junction box that can be used with the present invention. The box may be fastened directly to a ceiling joist or be mounted between joists on a hanger.

A quick connect mounting device is used to connect the fan to the electrical junction box and the electrical supply wires to the fan. In one embodiment of the mounting device, shown in FIGS. 2–11, the weight of the fan is transferred from the hanger tube to the mounting device through the fan bell. In an alternative embodiment, shown in FIGS. 12–20, the weight of the fan is transferred directly from the hanger tube to the mounting device by means of a ball and socket joint.

FIGS. 2 to 11 shows details of one embodiment of a quick connect device 12 according to the present invention. The quick connect device 12 includes a mounting plate 16 that attaches to an electrical junction box 10. The mounting plate has two through holes 18, 20 to pass through two threaded screws 22, 24 that are received by the box's internally threaded shoulder rivets 26, 28 to attach the mounting plate 16 to the junction box 10. The screws 22, 24 and rivets 26, 28 secure the mounting plate 16 to the electrical box 10 and provide adequate support and rigidity to sustain the weight and torque of a ceiling fan.

In an alternative embodiment, not shown but easily understood from the previous paragraph, the mounting plate has a pair of key slots in place of the through holes. The screws 22, 24 are initially threaded part way into the rivets 26, 28, and the key slots of the mounting plate are aligned with barrel of the screws. Thereafter, the mounting plate is rotated to move the screws into the slots and the screws are tightened to secure the mounting plate to the junction box. Any configuration of the mounting plate that provides the same function is contemplated as another possible alternative embodiment.

The mounting plate 16 holds an electrical receptacle 30. In the embodiment depicted in FIGS. 1 to 11, the electrical receptacle is a conventional three-prong receptacle. Electrical wires 32 are connected to the terminals of the receptacle 30 to supply electricity to the fan 2.

Figure 3:
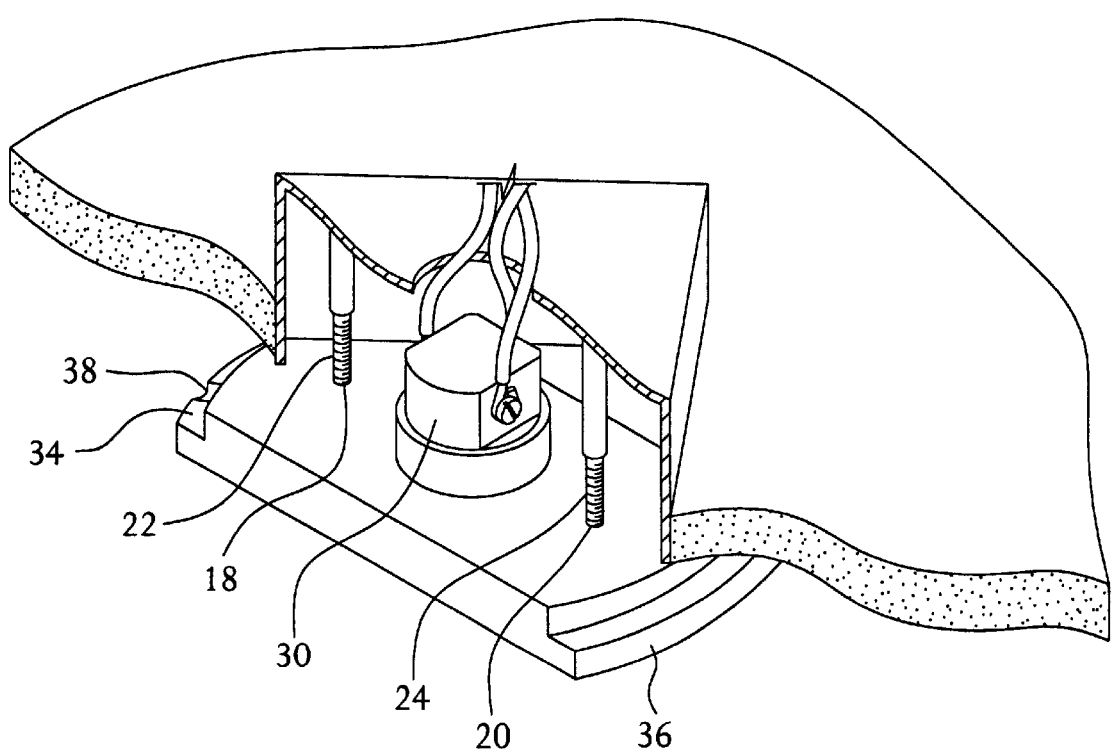
FIG. 3 is a perspective view of the mounting plate of the quick connect device illustrated in FIG. 1.
Figure 4:
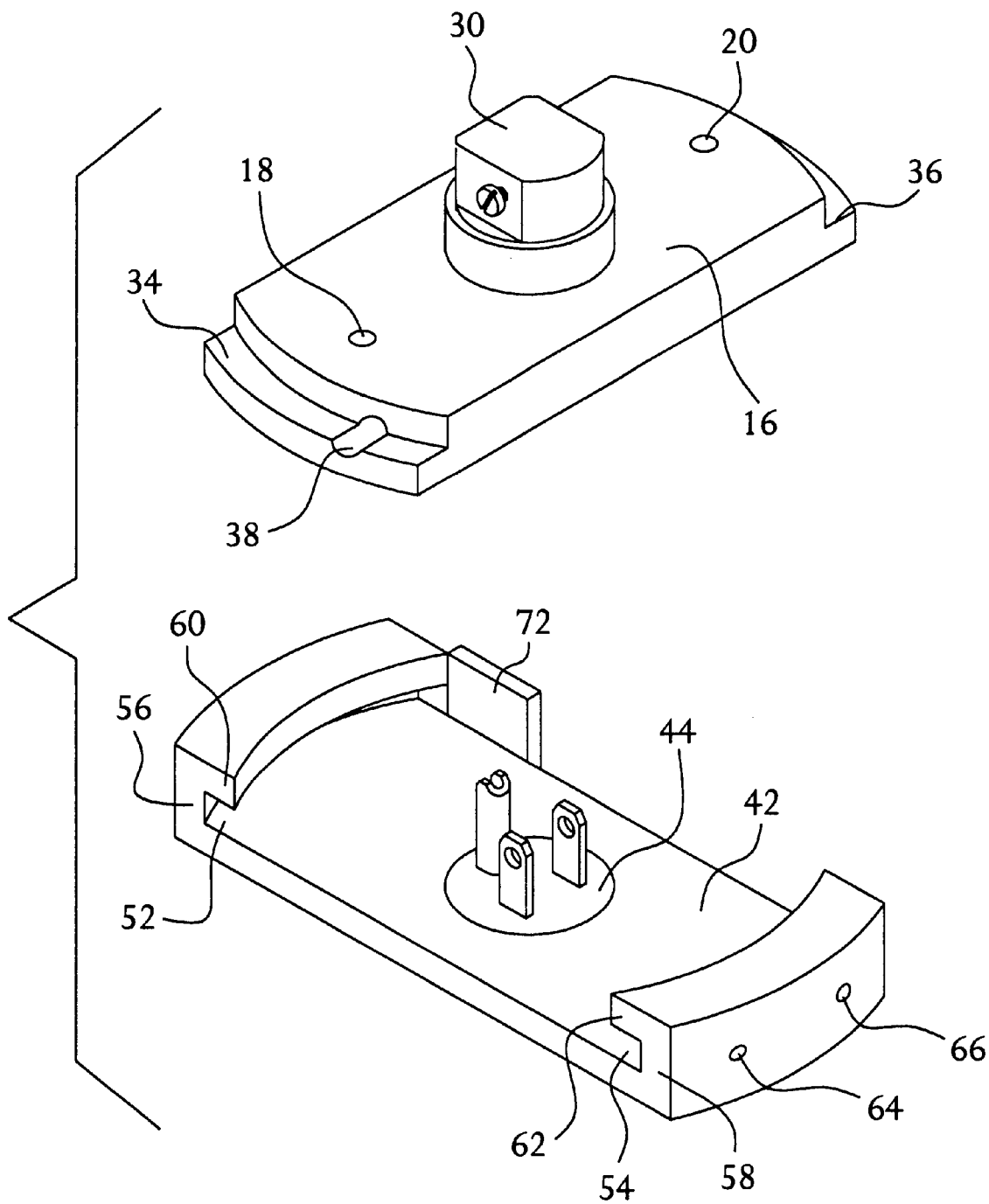
FIG. 4 is a exploded view of the quick connect device illustrated in FIG. 1.

Referring now to FIGS. 3 and 4, the upwardly facing side of the mounting plate 16 is cut back to form flanges 34, 36 located on opposite ends of the mounting plate 16 and extending from its downwardly facing side. Bores 38, 40 (see FIG. 10) are formed in the top surface of each of the flanges 34, 36 and extend into the main body of the mounting plate 16, forming cut-outs in the flanges and hollow cylindrical cavities in the main body, as shown in FIG. 4. The purpose of the bores is explained below.

Figure 8:
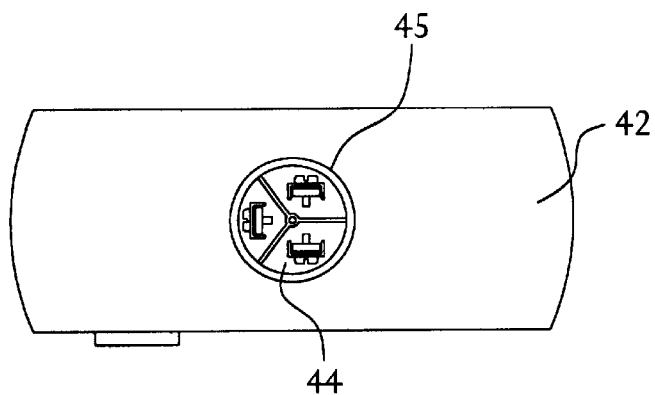
FIG. 8 is another bottom plan view of the coupling plate of the quick connect device illustrated in FIG. 1.
Figure 9:
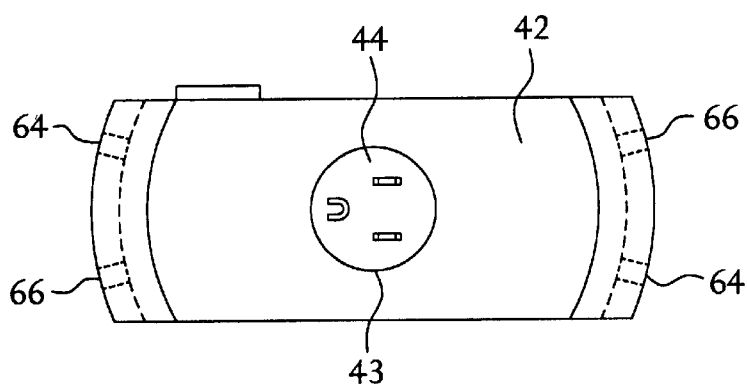
FIG. 9 is a top plan view of the coupling plate of the quick connect device illustrated in FIG. 1.
Figure 10:
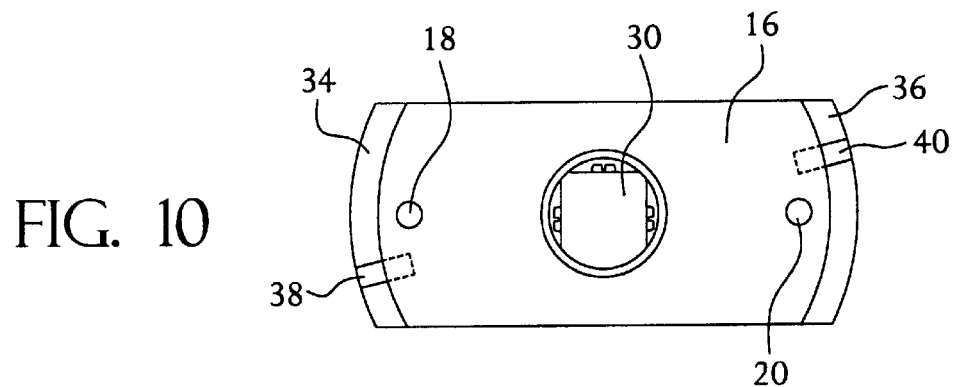
FIG. 10 is a top plan view of the mounting plate of the quick connect device illustrated in FIG. 1.
Figure 11:
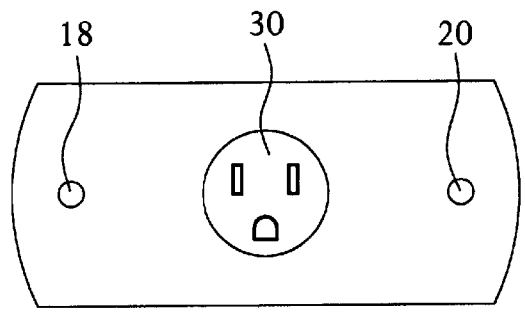
FIG. 11 is a bottom plan view of the mounting plate of the quick connect device illustrated in FIG. 1.
Figure 12:
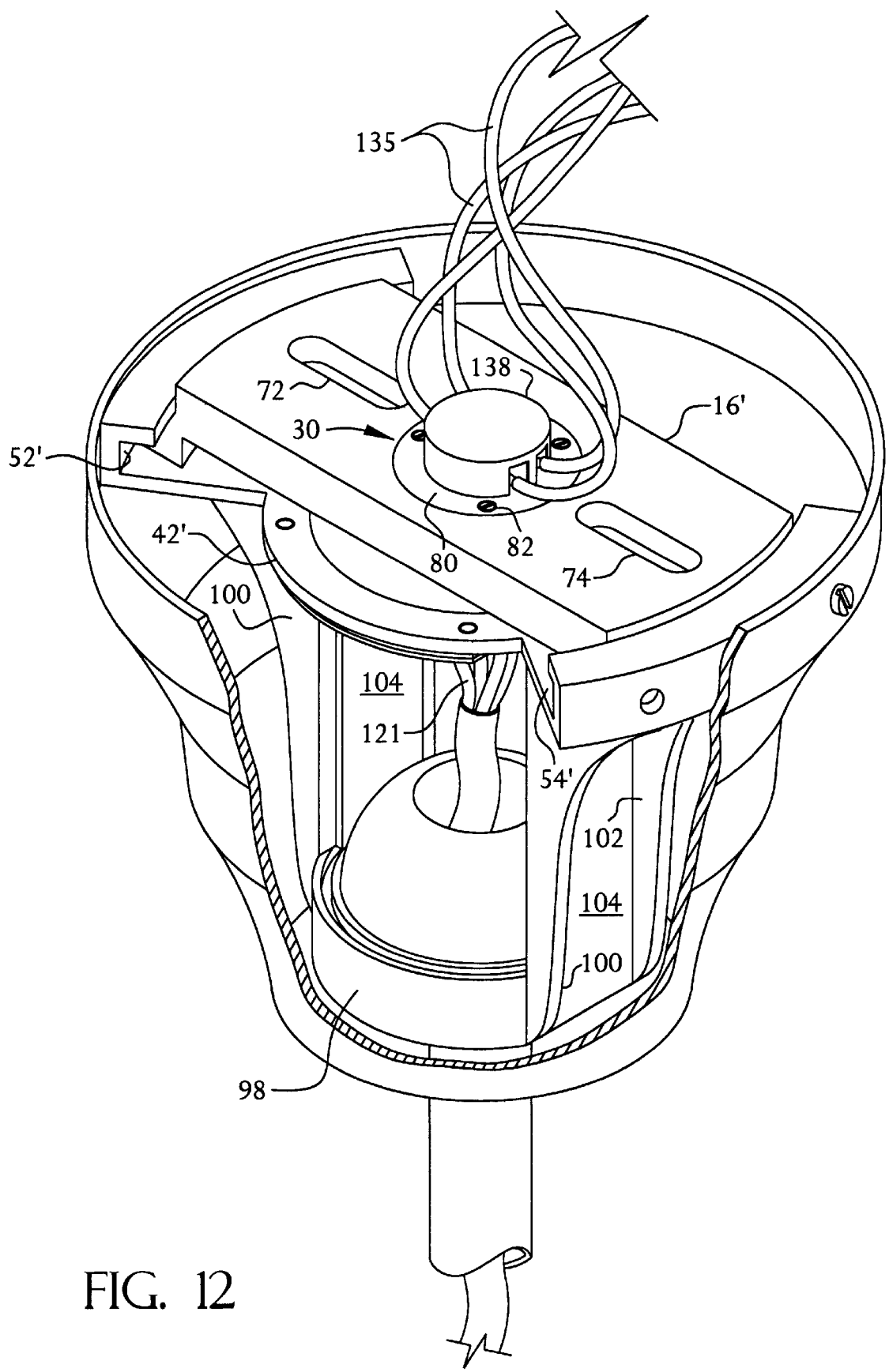
FIG. 12 is a perspective view of an alternative embodiment of a quick connect device according to the present invention.
Figure 13:
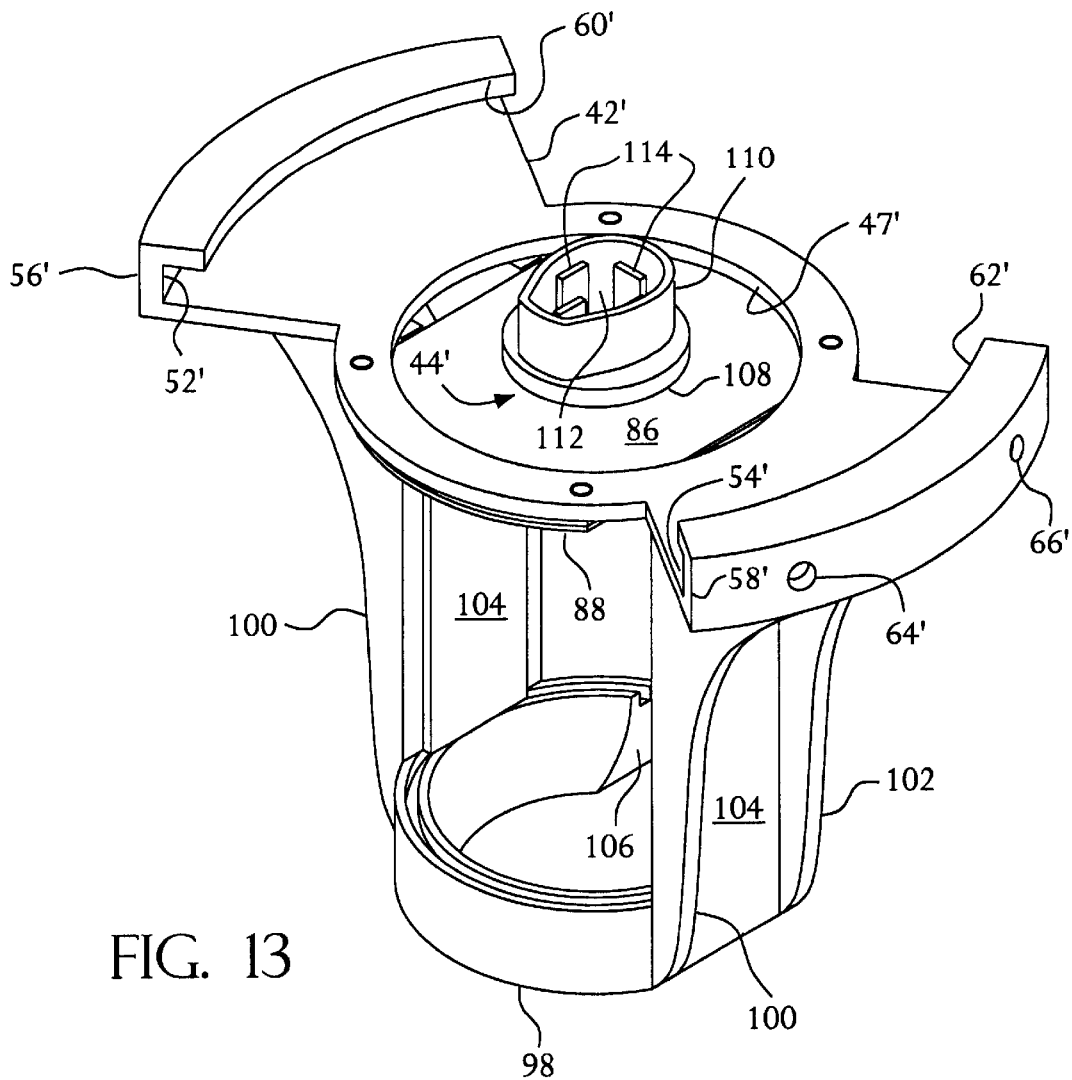
FIG. 13 is a perspective view of the upper side of the coupling plate and plug of the alternative embodiment shown in FIG. 12.
Figure 14:
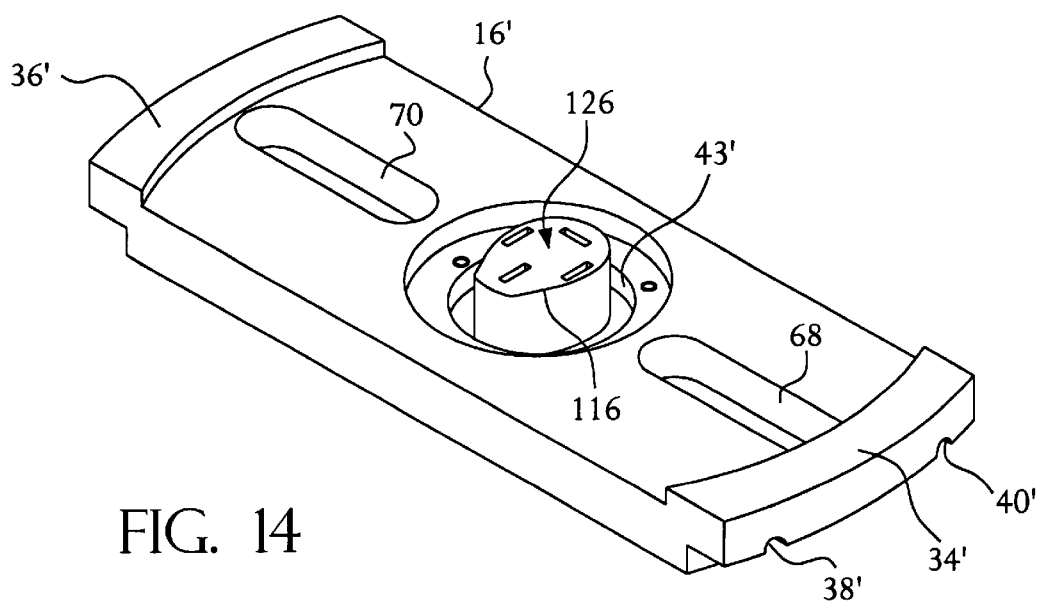
FIG. 14 is a perspective view of the lower face of the mounting plate and receptacle of the alternative embodiment shown in FIG. 12.
Figures 15, 16:
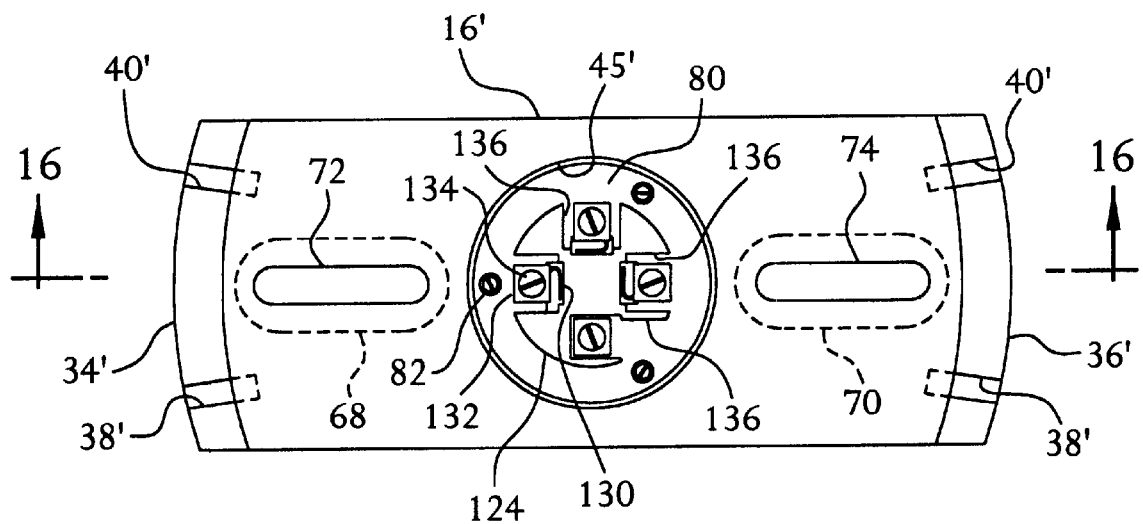
FIG. 15 is a plan view of the mounting plate and receptacle shown in FIG. 13.
FIG. 16 is a cross-sectional view of the mounting plate and receptacle as taken along line 16—16 of FIG. 15.
Figure 17:
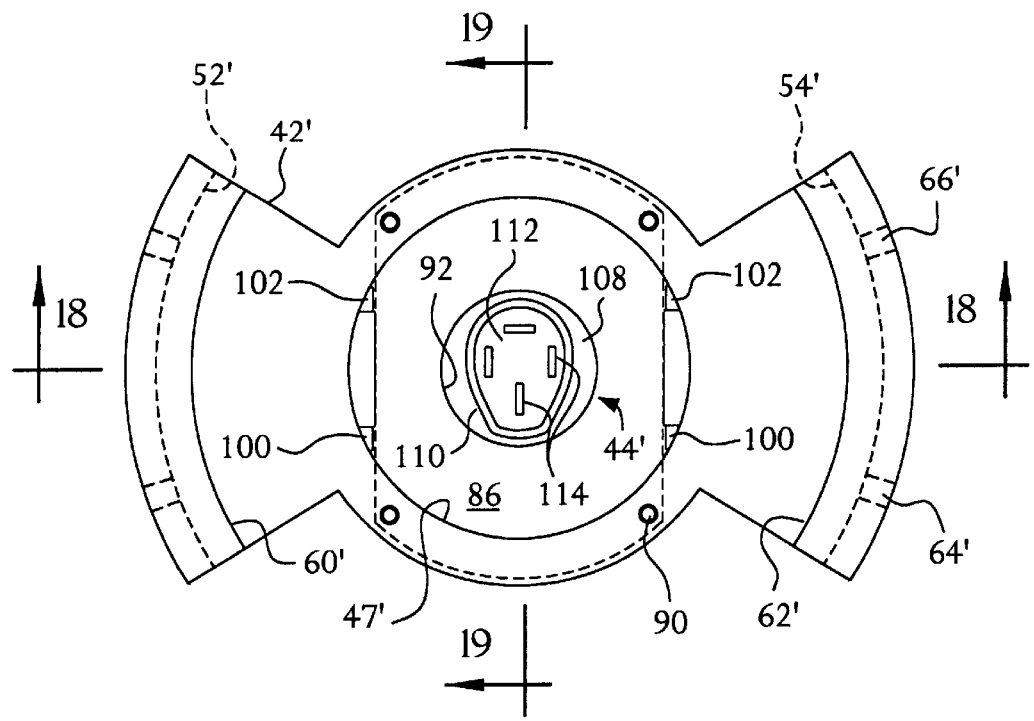
FIG. 17 is a plan view of the coupling plate and plug shown in FIG. 13.
Figure 18:
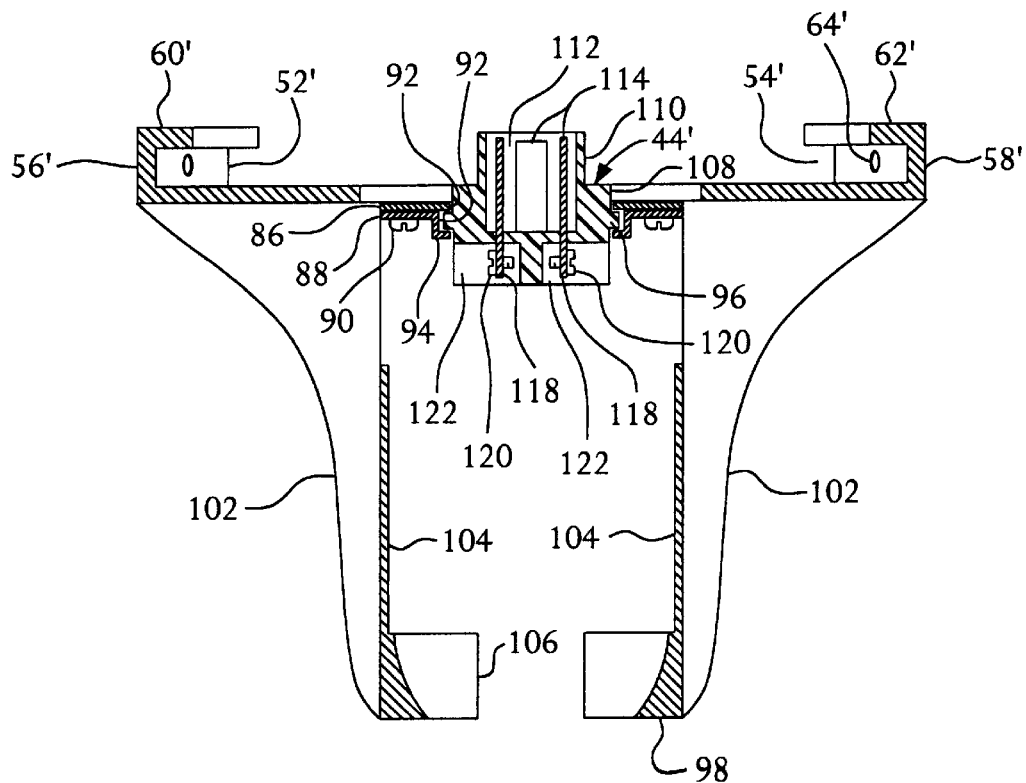
FIG. 18 is a cross-sectional view of the coupling plate and plug as taken along line 18—18 of FIG. 17.
Figure 19:
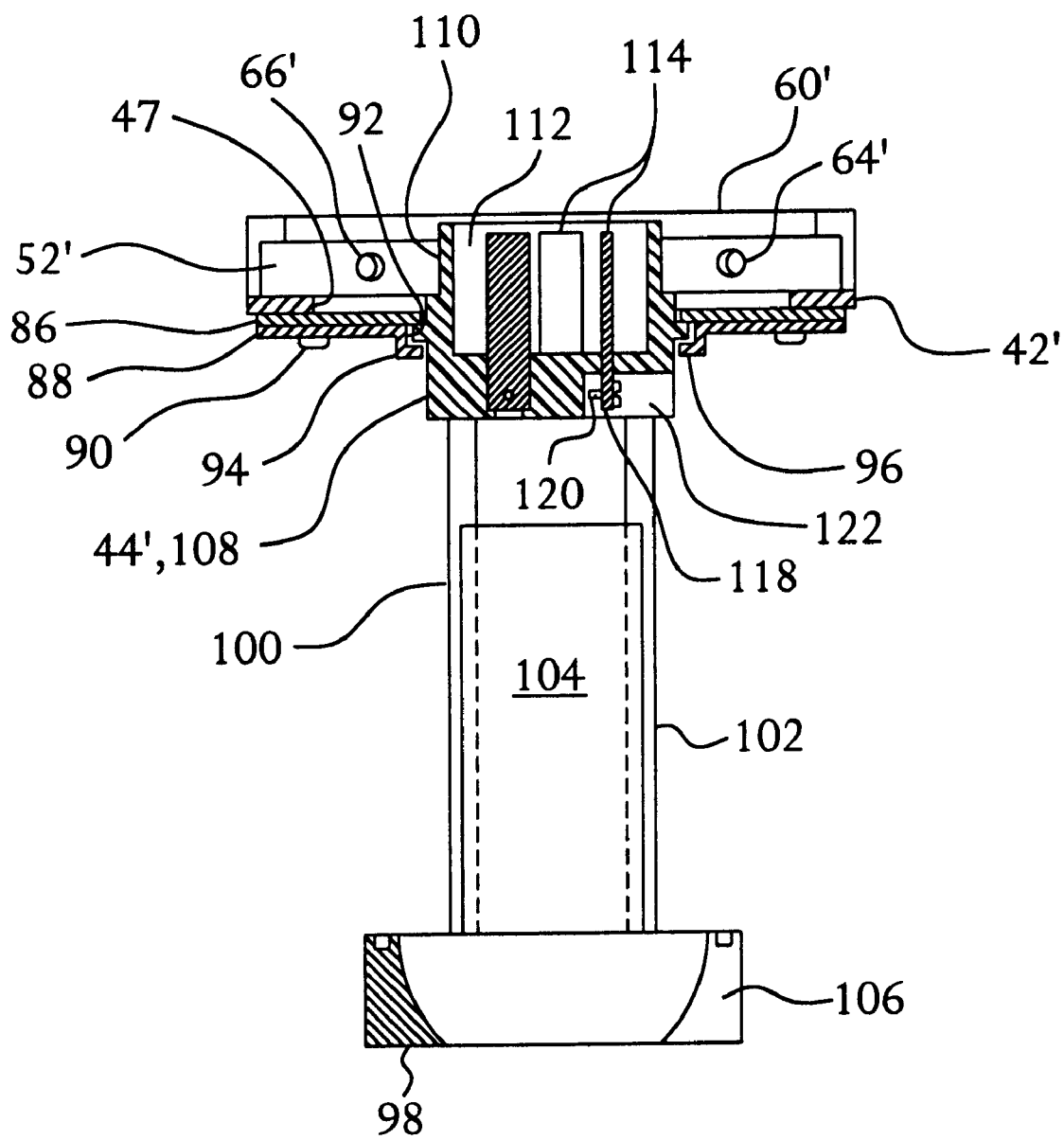
FIG. 19 is a cross-sectional view of the coupling plate and plug as taken along line 19—19 of FIG. 17.
Figure 20:
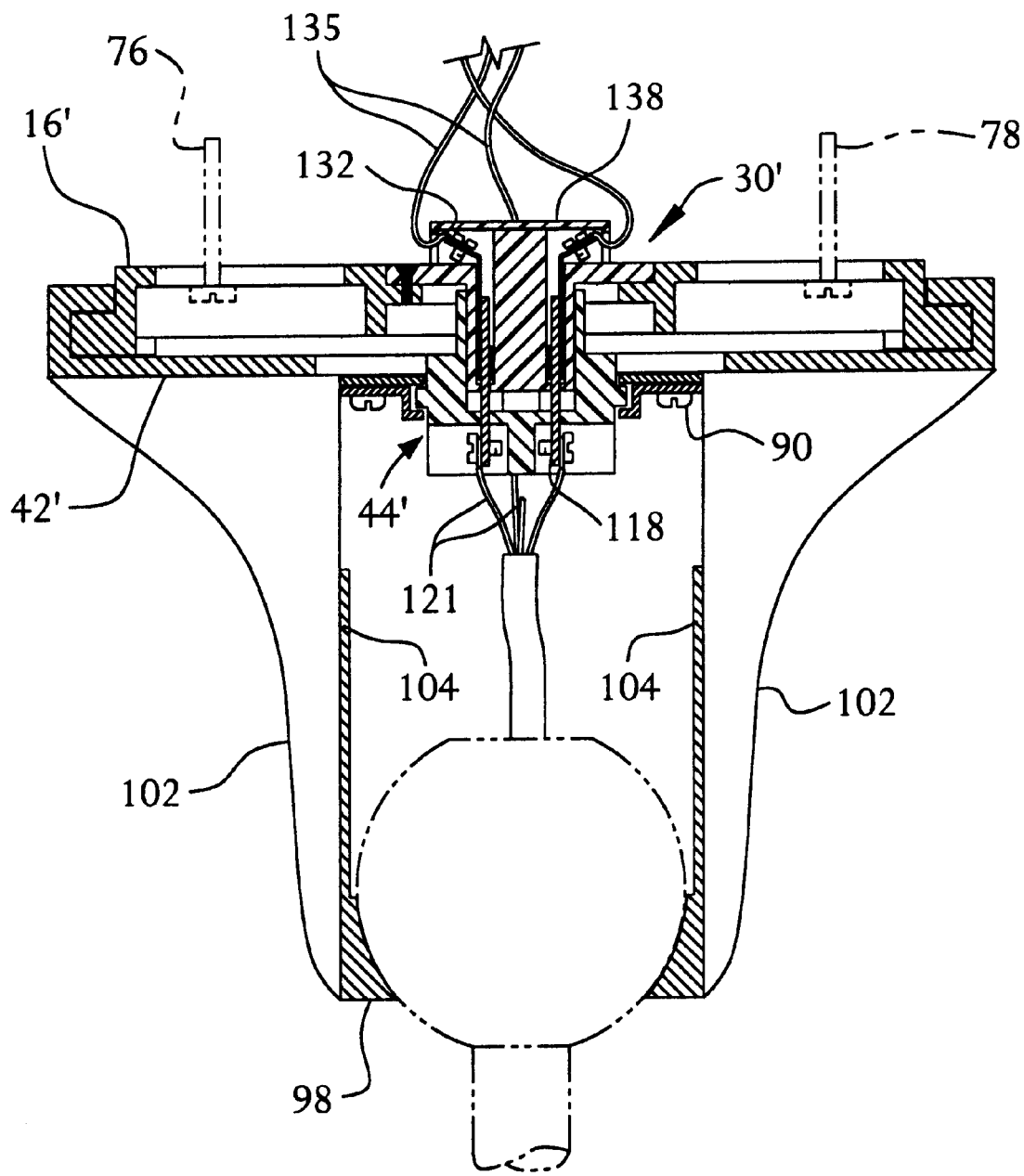
FIG. 20 is a cross-sectional view of the quick connect device, comprising a combination of the cross-sectional views of FIGS. 16 and 18, showing the plug and coupling plate engaging, respectively, the receptacle and receiving plate.

Referring to FIGS. 4, 8 and 9, the quick connect device 12 also includes a coupling plate 42 to which the bell 14 is attached. The coupling plate 42 holds a conventional cylindrical three-prong plug 44, which is secured to the coupling plate 42 in a fashion that enables the coupling plate to rotate around the plug (or the plug to rotate inside the coupling plate). In the depicted example, the coupling plate 42 has a central aperture 43 to hold the cylindrical body of the plug 44. The central aperture 43 has a diameter at the upwardly facing side of the coupling plate 42 that is slightly less than the diameter of the plug 44 so that the plug cannot be pulled through the aperture 43 from the upwardly facing side of the coupling plate 42. The downwardly facing side of the coupling plate 42 has a rabbet 45 adjacent the periphery of the aperture that has a diameter slightly larger than the diameter of the plug 44, which enables the plug to rotate within the rabbet 45.

Figure 7:
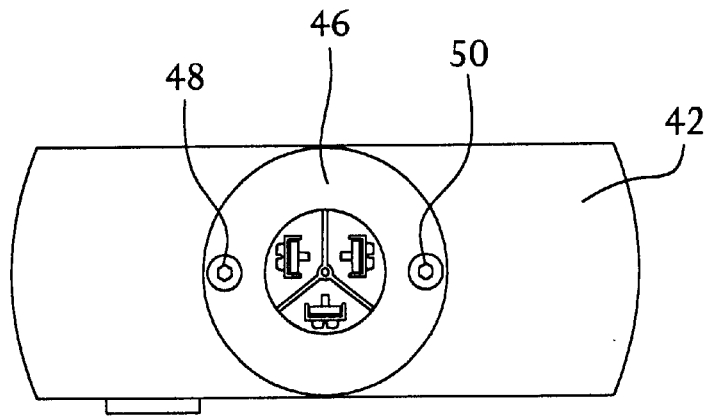
FIG. 7 is a bottom plan view of the coupling plate of the quick connect device illustrated in FIG. 1.

As shown in FIG. 7, a retaining ring 46 is attached to the downwardly facing side of the coupling plate 42. The retaining ring 46 has a central opening to pass through electrical wires from the fan 2. The retaining ring 46 is fixed to the coupling plate 42, in this embodiment by a pair of screws 48, 50. This configuration enables the coupling plate 42 to rotate relative to the plug 44 about an axis normal to the upwardly facing side of the coupling plate 42.

A pair of latch slots 52, 54 are defined at opposite ends of the coupling plate 42 by a pair of upwardly-extending end walls 56, 58 of the coupling plate extending upwardly (as illustrated in FIG. 4) and a pair of upper walls 60, 62 that extend inwardly from the upper ends of the end walls 56, 58. The latch slots 52, 54 are shaped and sized to receive the flanges 34, 36 of the receiving plate.

Figure 6:
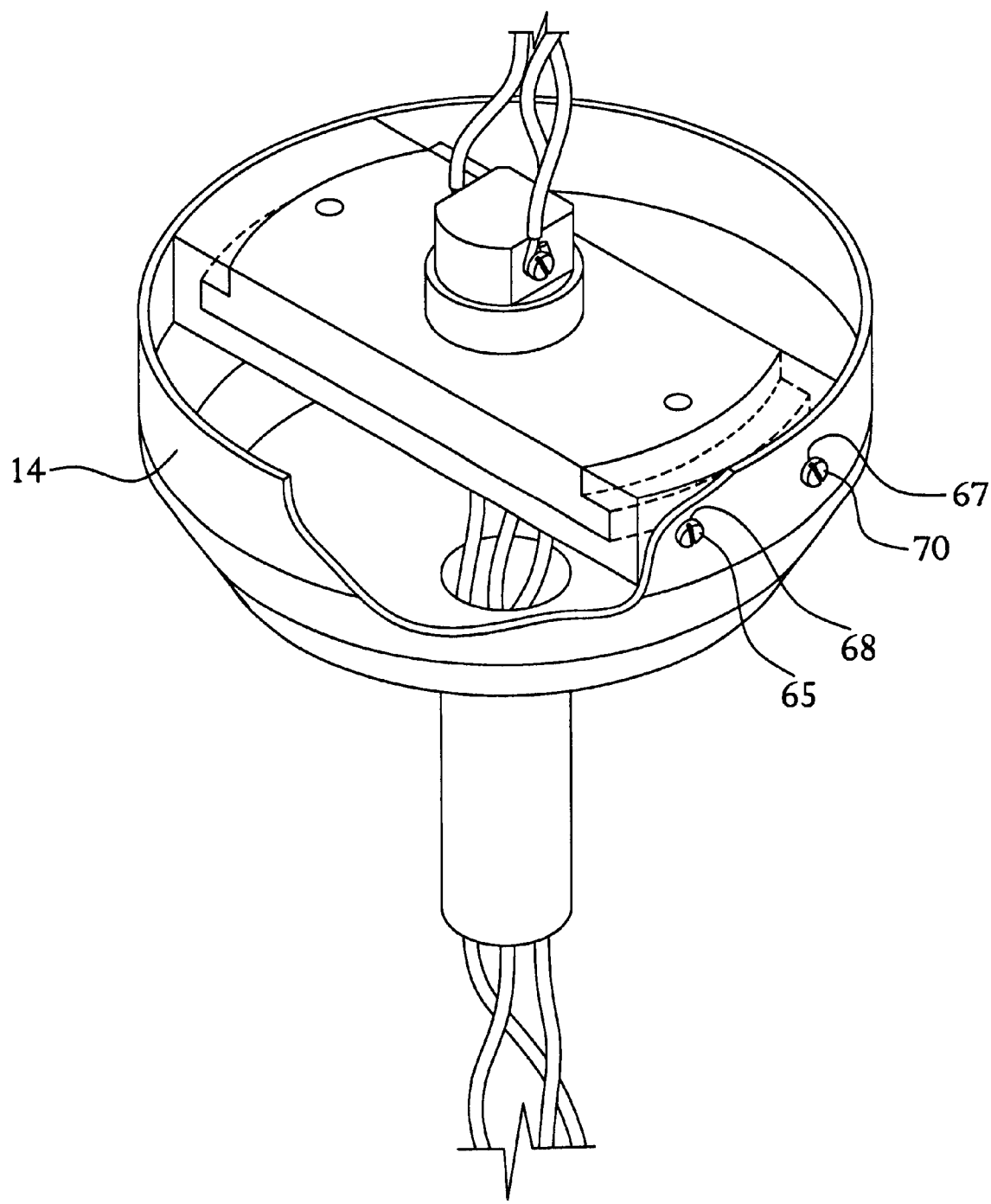
FIG. 6 is a perspective view of a quick connect device illustrated in FIG. 1 attached to a ceiling fan bell.

The coupling plate 42 has two pairs of screw holes 64, 66 (see FIG. 9) to fasten the coupling plate 42 to the fan bell 14. Each pair of screw holes 64, 66 has one hole formed in each end wall 56, 58. As illustrated in FIG. 6, the fan's bell 14 also has two pairs of screw holes 65, 67 that align with the coupling plate's screw holes 64, 66, respectively, when bell 14 is properly positioned with respect to the coupling plate 42. The second hole (not shown) of each pair of screw holes 65, 67 is located diametrically opposite the corresponding hole 65, 67 shown in FIG. 6. The pair of screw holes 65 receive screws 68, which extend through the fan bell 14 and into the coupling plate screw holes 64 and secure the coupling plate 42 in the bell 14.

When the mounting plate 16 and the coupling plate 42 are rotated into their latched position (as shown in FIG. 6 and described below), the second set of coupling plate screw holes 66 align with the mounting plate bores 38 40. Once the two plates are aligned, the second set of screw holes 66 in the coupling plate 42 and the corresponding second set of screw holes 67 in the bell receive screws 70 which extend through the bell 14, through the end wall and into the bores 38, 40 in the receiving plate.

The coupling plate may include a stop 72 along one side of the mounting plate to facilitate alignment of the coupling plate and the receiving plate, as described below.

FIGS. 12–20 show an alternative, presently-preferred mounting device of the present invention that includes many of the same features shown and described with respect to the embodiment of FIGS. 2–12. However, the presently-preferred embodiment includes features, such a safety features that protect against electrical shocks and short circuits, which are not present in the embodiment shown in FIGS. 2–11.

The mounting device comprises a mounting plate 16' and a coupling plate 42' that retain, respectively, an electrical receptacle 30' and an electrical plug 44' adapted to engage the receptacle 30'. Referring to FIGS. 12, 14–16 and 20, the mounting plate 16' includes two grooves 68, 70 and two slotted holes 72, 74 adapted to receive fasteners 76,78 for attaching the mounting plate 16' to a junction box. Typically, these fasteners will be either headed screws that engage the junction box or threaded studs that engage the junction box and have nuts to hold the mounting plate on the studs. The grooves 68, 70 allow the screw heads or nuts to be recessed within the mounting plate 16' to avoid interference with the coupling plate 42'. The slotted holes 72, 74 allow the mounting device to be used with various junction boxes having different fastener spacings.

A central aperture in 43' the mounting plate 16' allows the receptacle 30' to pass from one side of the mounting plate 16' to the other. The upper side (when the mounting device is in its installed position) of the mounting plate 16' has a rabbet 45' adjacent the periphery of the aperture 43' for engaging a flange 80 on the receptacle 30'. The receptacle 30' is secured to the mounting plate 16' by three screws 82 that pass through the flange 80 and into the mounting plate 16'. Similar to the embodiment shown in FIGS. 2–11, the embodiment illustrated in FIGS. 12–21 has flanges 34', 36' for engaging the coupling plate 42' and bores 38', 40' for receiving threaded fasteners used to secure a fan bell to the mounting device.

Referring now to FIGS. 12, 13 and 18–20, the coupling plate 42' holds the electrical plug 44', which is secured to the coupling plate 42' in a manner that enables the plug 44' and coupling plate 42' to rotate relative to one another. In the depicted example, the coupling plate 42' has a relatively large central aperture 47' that allows the plug 44' to pass therethrough. The plug 44' is mounted to the coupling plate 42' by upper and lower mounting plates 86, 88, which are attached to the coupling plate 42' by four screws 90. However, other means of fastening the upper and lower plates to the coupling plate, such as bolts, rivets, weld, adhesive or the like, may be used.

Each of the upper and lower plates 86, 88 has a central circular aperture 92, and the lower plate 88 has an L-shaped retaining flange 94 around the periphery of the aperture 92. An annular boss 96 on the plug 44' is sandwiched between the upper plate 86 and the lower leg of the retaining flange 94, allowing the plug 44' to rotate relative to the coupling plate 42'.

Similar to the embodiment shown in FIGS. 2–11, the coupling plate 42' of the embodiment illustrated in FIGS. 12–20 includes a pair of latch slots 52', 54' for receiving the flanges 34', 36' of the receptacle plate 16'. The latch slots 52', 54' are defined by a pair of upwardly-extending end walls 56', 58' attached to opposite ends of the coupling plate 42' and a pair of inwardly extending upper walls 60', 62' attached to the end walls 56', 58' at their upper ends. Each of the ends walls 56', 58' also includes a pair of screw holes 64', 66' for fastening the coupling plate 42' to a fan bell.

The coupling plate 42' includes a generally annular ball socket 98 for forming a ball and socket joint with a ball attached to the upper end of a fan hanger tube. The ball socket 98 is attached to the coupling plate 42' by two pairs of hangers 100, 102 attached to the coupling plate 42' adjacent opposite ends thereof. A stiffener 104 is attached to each pair of hangers 100, 102 to prevent the ball socket 98 from swaying due to an unbalanced fan and/or the hangers from racking due to torque caused by the fan's motor. Preferably, the socket 98 includes an opening 106 that enables a ball and hanger tube assembly to be inserted into the socket 98 from one side of the coupling plate 42'.

The electrical plug 44' and receptacle 30' are specially designed for safe and easy connection to one another. The plug 44' includes a generally circular base 108 made of a non-conductive material. However, the base may be any shape desired, such as rectangular, oval or the like. A skirt 110 is attached to and extends away from one end of the base 108. The skirt 110 is made of the same non-conductive material as the base 108 and is formed integrally therewith. However, the skirt may be made of another material, formed separately from the base and/or attached to the base by chemical bonding, heat bonding, adhesive bonding, mechanical fastening or the like.

The inner periphery of the skirt 110 and the portion of the base 108 surrounded by the skirt 110 define a cavity 112. A plurality of electrical conductors 114 engage the base 108 and extend from the base 108 into the cavity 112. In the embodiment shown, the conductors 114 are blade-type conductors. Other types of conductors, however, such as cylindrical, tubular or the like, may be used. Although four conductors 114 are shown, any number of conductors may be provided. Moreover, the conductors may be arranged in any pattern desired.

When the plug 44' and receptacle 30' are engaged with one another, the skirt 110 sleevedly engages a like-shaped receiver 116 on the receptacle 30'. The configuration of the skirt 110 and receiver 116 prevents a user from touching the conductors 114 with a finger, tool or other object when the plug 44' and receptacle 30' are being engaged with one another and when they are only partially engaged with one another, protecting the user from an electrical shock and/or the electrical supply circuit from short-circuiting.

In a preferred embodiment, the inner periphery of the skirt 110 and the outer periphery of the receiver 116 define a shape that has no more than one axis of symmetry so that the shape defines the relative alignment of the plug 44' and receptacle 30' necessary to engage the two parts. In addition, a non-circular or a circular and keyed skirt and receiver would prevent rotation of the engaged parts relative to one another to avoid damaging the conductors. This is particularly advantageous when the coupling plate 42' is rotated relative to the mounting plate 16' while engaging the coupling plate 42' to the mounting plate 16' or disengaging the coupling plate 42' from the mounting plate 16'.

The conductors 114 have terminals 118 for connecting the plug 44' to an electrical circuit. In the embodiment shown, the terminals 118 are screw-type terminals having screws 120 for connecting the plug 44' to bare-ended fan wires 121. Other type of terminals, such as spring loaded, soldered, compression or the like, may alternatively be used. Each terminal 118 is located within a recess 122 in the base 108 that allows access to the terminal screw 120 by a screw driver and egress of a wire from the base 108. Alternatively, the terminals may extend into one large recess, beyond the terminal end of the base, out the side of the base or the like. In an alternative embodiment, the plug may be pre-molded with the conductor/wire connection molded into the base, eliminating the need for terminals.

The receptacle 30 has a generally circular base 124 attached to the receiver 116. The base, however, may be any shape desired, such as polygonal, oval or the like. In the preferred embodiment, the base and the receiver are made of a non-conductive material and are formed integrally with one another. However, the base and the receiver may be made of different materials, formed separately from one another and/or attached to one another by chemical bonding, heat bonding, adhesive bonding, mechanical fastening or the like.

The receiver 116 has a face 126 and four sockets 128 for receiving the conductors 114 when the plug 44' is engaged with the receptacle 30'. Each socket 128 contains an electrical contact 130 that engages a corresponding one of the conductors 114 and a terminal 132 for connecting the contact 130 to an electrical circuit. The terminals 132 are screw-type terminals having screws 134 for connecting the receptacle 30' to bare-ended supply wires 135. Other type of terminals, such as spring loaded, soldered, compression or the like, may alternatively be used. Each terminal 132 is located within a recess 136 the base 124 that allows access to the terminal screw 134 by a screw driver and side egress of a wire conductor from the base 124. Alternatively, the terminals may extend into one large recess, beyond the terminal end of the base, out the side of the base or the like.

The terminals 132 and the bare ends of the wires 135 are covered by a cap 138 made of a non-conductive material. The cap 138 comprises a cover 140 and a skirt 142 that forms a friction fit with the circular periphery of the base 124. Openings 144 are provided in the skirt 142 to allow the wires 135 to pass from outside the cap 138 to the terminals 132.

The cap 138 is particularly suited for preventing fingers, tools and other objects from touching the terminals and/or bare ends of the conductor wires to prevent electrical shocks and shorts. For example, if the receptacle were mounted to an electrical junction box containing spliced wires that have lost their wire nuts or other insulation, the cap would prevent the open splices from contacting the terminal and/or bare ends of the wires attached to the terminals. In alternative embodiments, the cap may be eliminated and/or another cap may be provided to cover the terminals of the plug. The cap 138 also protects the terminals from water falling from above the cap 138.

Installation of a Ceiling Fan with a Quick Connect Device

A ceiling fan is installed using the quick connect device of FIGS. 2–11 using the following steps. In a preferred embodiment, the fan is expected to be sold with the coupling plate 42 having the fan's electrical supply wires already connected to the proper conductors of the electrical plug 44. The mounting plate 16 will be included with the fan, but as an unattached item.

The first step is to connect the wires 11 from the electrical supply to the corresponding terminals of receptacle 30 in the mounting plate 16. The mounting plate 16 is then attached to the electrical box 10 by the screws 22, 24.

Figure 5:
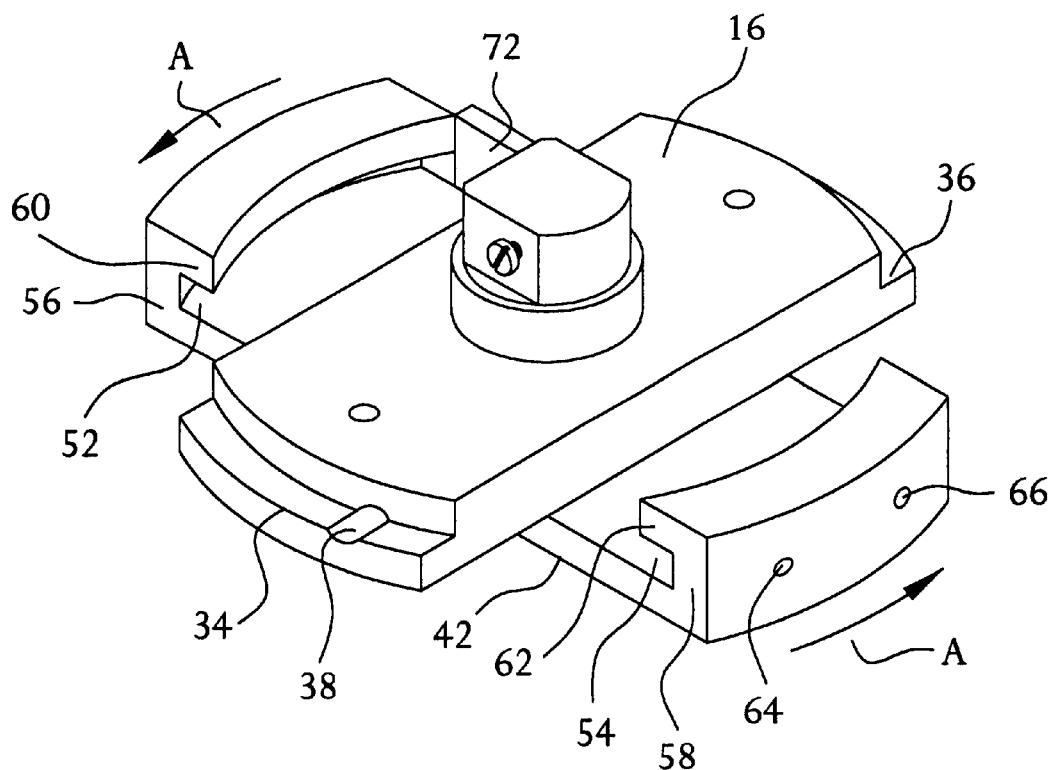
FIG. 5 is a perspective view of the quick connect device illustrated in FIG. 1 after initial engagement between the receptacle and plug.

Next, the fan is lifted to the junction box and the plug 44 is rotated to a position where it can be inserted into the receptacle 42, as in FIG. 5. In this position, the coupling plate 42 will be across the mounting plate 16 at a sufficient angle that the flanges 34, 36 of the mounting plate 16 do not contact the coupling plate. The fan is then raised to push the prongs of the plug 44 fully into the receptacle 30, and the fan is then rotated (as shown by arrow A in FIG. 5) to align and interlock the two plates, that is, the flanges 34, 36 in the mounting plate 16 are in the latch slots 52, 54 of the coupling plate 42. If the coupling plate 42 has a stop 72, the fan is rotated until the mounting plate 16 contacts the stop 72, at which position the respective screw holes will be aligned. The screws 70 are then tightened to fix the coupling plate 44 to the mounting plate 16. The screws 70 hold the plates 16, 42 securely together and prevent them from separating regardless of the direction that the fan blades rotate.

Thus, the required time and difficultly of hanging and electrically connecting the fan is greatly reduced, and the operation can be easily done by one person.

One skilled in the art will readily understand that the installation of electrical fixtures other than ceiling fans would be similar to that described above, as would installation of an electrical fixture using the embodiment of the mounting device depicted in FIGS. 12–20. In addition, the mounting device may be sold separately from the electrical fixture, in which case the plug would include terminals for attaching the fan wires to the plug.

The present invention may be embodied in other specific forms. Accordingly, reference should be made to the following claims, rather than to the foregoing embodiments, to appreciate the scope of the invention.

What is claimed is:

1. A mounting device for hanging an electrical fixture from an overhead support and connecting the fixture to an electrical circuit, comprising;

a mount attachable to an electrical junction box;

a coupler attachable to an electrical fixture and engageable with the mount;

an electrical plug including a plug base, a skirt and a plurality of elongated electrical conductors, the skirt being attached to the plug base and extending away from the plug base, the skirt having an inner surface and an inner periphery, the inner surface of the skirt and a portion of the plug base encompassed by the skirt defining a cavity, the conductors engaging the plug base and extending away from the plug base into the cavity, the conductors contained within the cavity; and an electrical receptacle, the receptacle including a receptacle base and a receiver attached to the receptacle base, the receiver having an outer periphery and a plurality of sockets extending into the receiver, the outer periphery of the receiver adapted to slidably engage the inner surface of the skirt of the plug, each socket for receiving one of the conductors of the plug;

the plug being secured to either the mount or the coupler and the receptacle being secured to the other, the conductors and skirt of the plug engaging the sockets and the receiver, respectively, of the receptacle when the plug is engaged with the receptacle;

wherein the mount includes a mounting plate and the coupler includes a coupling plate, the mounting plate being rotatably securable to the coupling plate and either the plug or the receptacle being rotatably coupled to the respective mounting or coupling plate to which it is secured.

2. The mounting device of claim 1 wherein each socket has a contact located within the socket and a terminal for connecting the contact to a wire, the receptacle including a cap engaging the receptacle base and covering the terminals.

3. The mounting device of claim 2 wherein the receptacle base has an outer periphery and the cap comprises a cover and a skirt, the cover substantially covering the terminals, the skirt engaging the outer periphery of the base and having at least one opening for allowing one or more wires to pass from outside the cap to a corresponding terminal.

4. The mounting device of claim 1 wherein the outer periphery of the receiver and the inner periphery of the skirt each define a cross-sectional shape having one axis of symmetry.

5. The mounting device of claim 1 wherein the electrical conductors are blade-type conductors.

6. The mounting device of claim 1 wherein the plug has four conductors and the receptacle has four sockets.

7. The mounting device of claim 1 wherein the mounting plate contains the receptacle and the coupling plate contains the plug.

8. The mounting device of claim 1 wherein the coupling plate is attachable to a fan bell.

9. The mounting device of claim 1 wherein the coupling plate includes a ball socket depending from the coupling plate, the ball socket adapted to receive a ball of an electrical fixture for forming a ball-and-socket type joint.

10. The mounting device of claim 7 wherein the plug is rotatably secured to the coupling plate.

11. The mounting device of claim 1 wherein the mounting plate has a flange extending from each opposite end thereof, and the coupling plate has a latch slot at each of its opposite ends, the latch slot configured to receive one of the flanges of the mounting plate.

12. The mounting device of claim 11 further comprising a lock fixing the relative position of the mounting plate to the coupling plate.

13. The mounting device of claim 12 wherein the lock comprises a receiving hole in the mounting plate, a through hole in the coupling plate and a locking rod insertable into the through hole and the receiving hole.

14. A mounting device for hanging an electrical fixture from an overhead support and connecting the fixture to an electrical circuit, comprising:

a mounting plate attachable to an electrical junction box;

a coupling plate attachable to an electrical device and rotatably securable to the mounting plate;

an electrical plug including a plug base made of non-conductive material, a skirt made of non-conductive material and a plurality of elongated electrical conductors, the skirt being attached to the plug base and extending away from the plug base, the skirt having an inner surface and an inner periphery, the inner surface of the skirt and a portion of the plug base encompassed by the skirt defining a cavity, the conductors engaging the plug base and extending away from the plug base into the cavity the conductors contained within the cavity; and an electrical receptacle, the receptacle including a receptacle base made of non-conductive material and a receiver attached to the receptacle base, the receiver having an outer periphery and a plurality of sockets extending into the receiver, the outer periphery of the receiver adapted to slidably engage the inner surface of the skirt of the plug, each socket for receiving one of the conductors of the plug;

the plug being secured to one of the plates and the receptacle being secured to the other, either the plug or receptacle being rotatably secured to its respective plate, the conductors and the skirt of the plug engaging the sockets and receiver, respectively, of the receptacle when the plug is engaged with the receptacle.

15. The mounting device of claim 14 wherein the outer periphery of the receptacle receiving portion and the inner periphery of the skirt each define a shape having one axis of symmetry.

16. The mounting device of claim 14 wherein the coupling plate includes a ball socket depending from the coupling plate, the ball socket adapted to receive a ball of an electrical fixture to form a ball-and-socket type joint.

17. The mounting device of claim 14 wherein each socket has a contact located within the socket and a terminal for connecting the contact to a wire, the receptacle including a cap engaging the receptacle base and covering the terminals.

18. The mounting device of claim 14 wherein the mounting plate has a flange extending from each opposite end thereof, and the coupling plate has a latch slot at each of its opposite ends, the latch slot configured to receive one of the flanges of the mounting plate.

19. A mounting device for hanging an electrical fixture from an overhead support and connecting the fixture to an electrical circuit, comprising;

a mounting plate having a flange extending from each of its ends, the mounting plate attachable to an electrical junction box;

a coupling plate having a latch slot at each of its opposite ends, each latch slot configured to receive a flange of the mounting plate by rotation of the coupling plate relative to the mounting plate, the coupling plate being attachable to an electrical fixture;

an electrical plug including a plug base made of non-conductive material, a skirt made of non-conductive material and a plurality of elongated electrical conductors, the skirt being attached to the plug base and extending away from the plug base, the skirt having an inner surface and an inner periphery, the inner surface of the skirt and a portion of the plug base encompassed by the skirt defining a cavity, the conductors engaging the base and extending away from the plug base into the cavity, the conductors contained within the cavity; and an electrical receptacle, the receptacle including a receptacle base made of non-conductive material and a receiver attached to the receptacle base, the receiver having an outer periphery and a plurality of sockets extending into the receiver, the outer periphery of the receiver adapted to slidably engage the inner surface of the skirt of the plug, each socket for receiving one of the conductors of the plug;

the plug being secured to either the receiving or the coupling plate and the receptacle being secured to the other, either the plug or receptacle being rotatably secured to its plate, the conductors and the skirt of the plug engaging the sockets and receiver, respectively, of the receptacle when the plug is engaged with the receptacle.

20. The mounting device of claim 19 wherein the outer periphery of the receptacle receiving portion and the inner periphery of the skirt each define a shape having one axis of symmetry.

21. The mounting device of claim 19 wherein the coupling plate includes a ball socket depending from the coupling plate, the ball socket adapted to receive a ball of an electrical fixture to form a ball-and-socket type joint.

22. The mounting device of claim 19 wherein the plug is rotatably secured to the coupling plate.

23. The mounting device of claim 19 wherein each socket has a contact located within the socket and a terminal for connecting the contact to a wire, the receptacle including a cap engaging the receptacle base and covering the terminals.

* * * * *